United States Patent [19]
Lucey

[11] Patent Number: 5,396,551
[45] Date of Patent: Mar. 7, 1995

[54] HEADSET AMPLIFIER

[75] Inventor: Robert E. Lucey, Sudbury, Mass.

[73] Assignee: Unex Corporation, Chelmsford, Mass.

[21] Appl. No.: 116,777

[22] Filed: Sep. 3, 1993

[51] Int. Cl.⁶ .............................................. H04M 1/00
[52] U.S. Cl. .................................... 379/395; 379/387; 379/441; 379/442; 381/106; 381/187; 381/4
[58] Field of Search ............... 379/395, 387, 441, 442; 381/106, 187, 4, 5, 6

[56] References Cited

U.S. PATENT DOCUMENTS

| | | | |
|---|---|---|---|
| 4,536,888 | 8/1985 | Wilson | 381/106 |
| 4,879,746 | 11/1989 | Young | 379/399 |
| 4,917,504 | 4/1990 | Scott et al. | 381/187 |
| 4,918,726 | 4/1990 | Snyder | 379/395 |
| 4,928,306 | 5/1990 | Biswas et al. | 379/201 |
| 4,930,156 | 5/1990 | Norris | 379/388 |
| 4,951,002 | 8/1990 | Hanon | 330/151 |
| 4,975,949 | 12/1990 | Wimsatt et al. | 379/387 |
| 5,036,536 | 7/1991 | Hanon et al. | 379/387 |
| 5,058,155 | 10/1991 | Larsen | 379/442 |
| 5,099,514 | 3/1992 | Acree | 379/441 |
| 5,185,789 | 2/1993 | Hanon et al. | 379/395 |

Primary Examiner—James L. Dwyer
Assistant Examiner—Jacques M. Saint-Surin
Attorney, Agent, or Firm—Weingarten, Schurgin, Gagnebin & Hayes

[57] ABSTRACT

A headset amplifier, adapted for use with a voltage source such as a battery, includes a time-out-timer circuit for deactivating the headset amplifier after a first predetermined period of time and for reactivating the amplifier in response to a signal fed to an input port of the time-out-timer circuit.

9 Claims, 6 Drawing Sheets

HEADSET AMPLIFIER

FIELD OF THE INVENTION

This invention relates to amplifier circuits and more particularly to headset amplifier circuits.

BACKGROUND OF THE INVENTION

As is known in the art of telephony, a host telephone typically has coupled thereto a telephone handset. The host telephone typically includes either a carbon microphone or an electret microphone.

As is also known, there has been a trend to provide host telephones having coupled thereto both a telephone handset and a telephone headset. Such telephone headsets are typically used in those applications in which it is desirable to provide a user having so-called "hands free" telephone operation.

Each of the different microphone types have different electrical characteristics including different impedance characteristics. To efficiently couple signals from the microphone to the headset, the headset amplifier should present a suitable impedance to the particular microphone. Thus, different headset amplifiers each having preselected electrical characteristics are often used to couple a particular type of microphone to the headset.

As is also known, the power requirements for each of the different microphones are different. For example, carbon microphones require a relatively high amount of power. Thus, such power may be coupled directly from the telephone line to which the microphone is connected.

Dynamic and electret microphones, however, typically require less power than can be coupled from the telephone line without sacrificing overall system performance. Thus, those systems which employ dynamic and electret microphones, are generally adapted to operate from power provided by an alternating current (AC) source or in those cases in which AC power is unavailable or inconvenient, a battery may be used.

When a battery is employed it is desirable to conserve the battery power. The headset amplifier may sometimes remain powered longer than needed, and consequently drain the battery. Thus, it would be desirable to provide a headset amplifier which may operate on battery power but which conserves battery power when the headset amplifier is not receiving signals from the host telephone or a telephone headset.

SUMMARY OF THE INVENTION

In accordance with the present invention, a headset amplifier, adapted for use with a voltage source includes a time-out-timer circuit for deactivating the headset amplifier after a first predetermined period of time and for reactivating the amplifier in response to a signal fed to an input port of the time-out-timer circuit. The time-out-timer circuit includes a time-out-timer amplifier circuit, having an input port coupled to an input port of the time-out-timer circuit and an output port coupled to the input port of a detector circuit. The time-out-timer circuit further includes a charge/discharge circuit having an input port coupled to the output port of the detector circuit and having an output port coupled to an output port of the time-out-timer circuit. With this particular arrangement, a headset amplifier which conserves the power of the voltage source is provided. The voltage source may be provided, for example, as a battery. The charge/discharge circuit may include an RC circuit. When no signal is received by the headset amplifier for a predetermined time, two minutes for example, the capacitor of the RC circuit becomes fully charged. In response to the capacitor becoming fully charged, the time-out-timer circuit powers down the headset amplifier circuit by de-coupling headset amplifier circuitry from the battery. Thus, the time-out-timer circuit allows the battery to remain charged for a longer period of time than batteries used in conventional headset amplifiers. When a handset is picked up, a low level transient signal is provided. If the time-out-timer detects such a low level transient signal or when the time-out-timer circuit detects a voice signal or a switching transient signal, a pulse signal having a predetermined pulse length is provided to the discharge circuit. The pulse length is selected to discharge the capacitor of the RC circuit in the charge/discharge circuit. The pulse signal generated by lifting the handset typically is not of long enough duration to fully discharge the capacitor. Thus, the detector circuit may include a pair of transistors coupled in a regenerative transistor loop which provides to the charge/discharge circuit a pulse signal having a pulse length which ensures that the capacitor in the charge/discharge circuit fully discharges.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
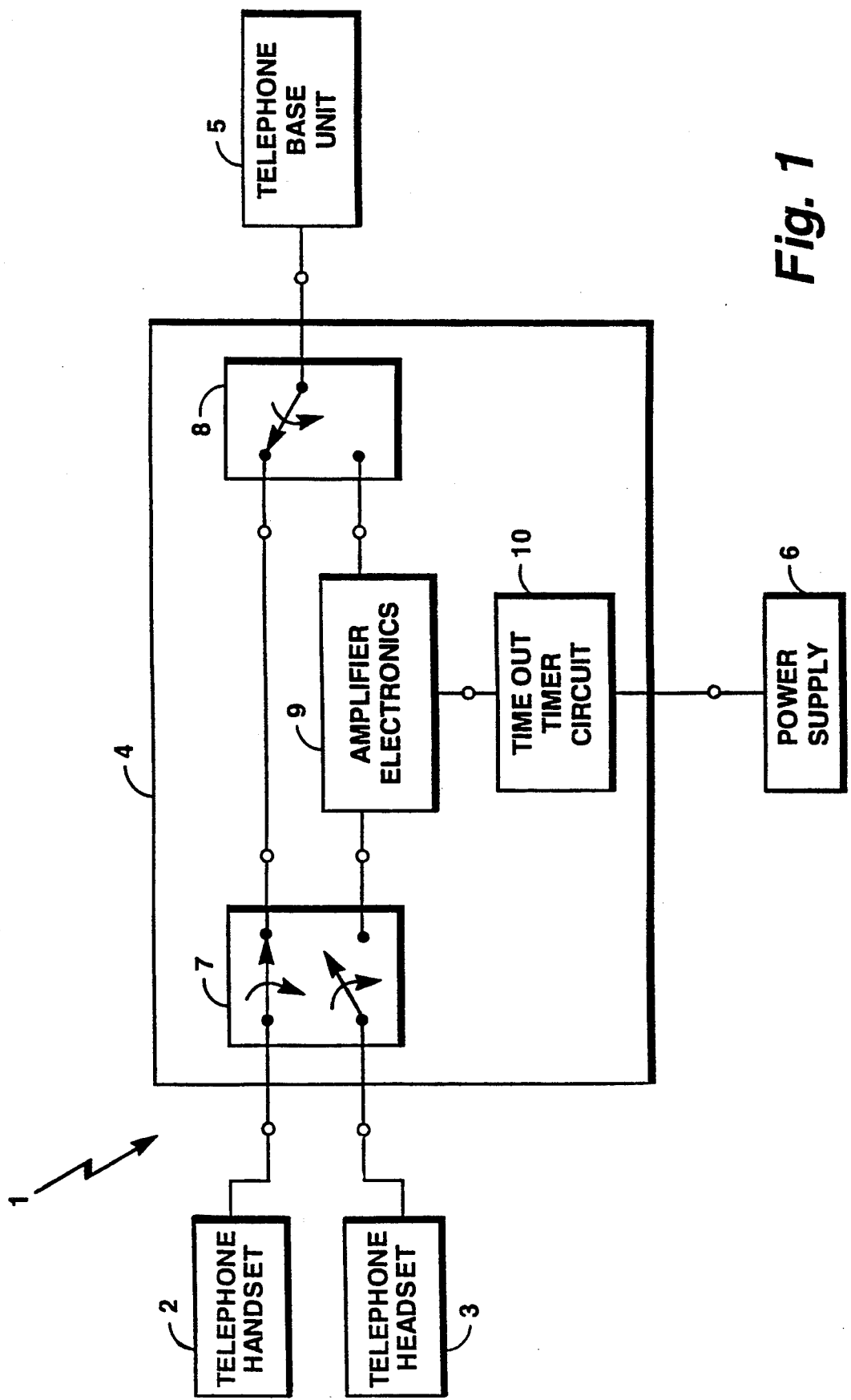
FIG. 1 is a block diagram of a universal headset amplifier.

Referring now to FIG. 1, a telephone apparatus 1 includes a telephone handset 2 and a telephone headset 3 each coupled to an amplifier circuit 4. The amplifier circuit 4 provides signal paths between the telephone handset 2, telephone headset 3 and a telephone base unit 5.

The amplifier circuit 4 includes a selector switch, here provided from a pair of switches 7, 8. When the switches 7 and 8 are each placed in a first switch position the switches 7, 8 provide a signal path between the telephone handset 2 and the telephone base unit 5. However, when the switches are placed in a second switch position the switches 7, 8 provide a signal path between the telephone headset 3 and the telephone base unit 5. through amplifier electronics 9. When the switches 7, 8 are placed in the second position, a microphone in the handset is thus replaced with a microphone in the headset and the amplifier electronics 9 provides appropriate impedances signal levels and the like to interface the headset microphone with the base unit 5.

The amplifier further includes a time-out timer circuit 10 coupled between the amplifier electronics 9 and a power supply 6. As will be described further below in conjunction with FIGS. 2–5 the time-out timer circuit decouples the power supply from the amplifier 4 to thus place the amplifier 4 in a power down mode when no signal is received by the amplifier 4 for a predetermined amount of time.

Figure 2:
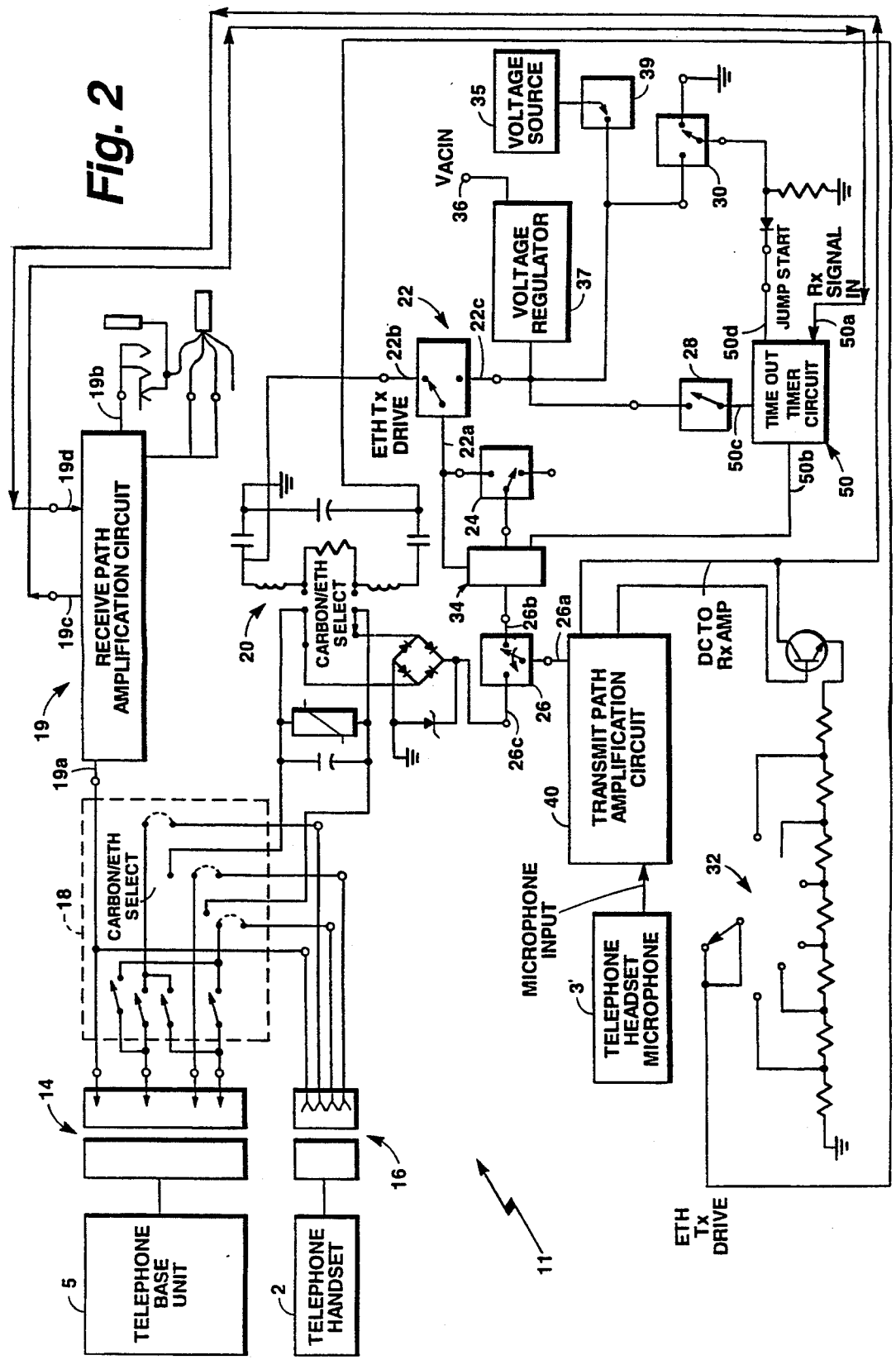
FIG. 2 is a more detailed block diagram of a universal headset amplifier.

Referring now to FIG. 2, a headset amplifier 11 includes a pair of modular plugs 14, 16 coupled to a selector switch 18. A receive path amplification circuit 19 is coupled to the modular plugs 14, 16 through the selector switch 18. The modular plug 14 couples a telephone base unit 5 to the headset amplifier 11 and modular plug 16 couples the headset amplifier to a telephone handset 2.

As will be described further below, a series of switch assemblies 18–34 are cooperatively switched to enable the headset amplifier 11 to operate with a host telephone microphone having either a carbon or an electret microphone. The switch assemblies 18–34 also enable the headset amplifier 11 to receive power through the telephone handset jack on the host telephone or to receive power provided from a voltage source 35 or from an external AC power source coupled to an AC input terminal 36.

The switch 20, is here provided as a double pole, double throw (DPDT) switch. The switch arms of the switch 20 are here shown positioned to place the headset amplifier 11 in a carbon mode of operation. Alternatively the switch arms may be positioned to place the headset amplifier 11 in an electret (ETH) mode of operation. The mode in which the headset amplifier 11 operates is, of course, selected in accordance with the type of host handset microphone jack to be coupled to the headset amplifier 11.

After the ETH or carbon mode of operation is selected, the switch 22 having common arm 22a and switch arms 22b, 22c is used to select an internal or an external power source. For example, the internal power source may be provided as a battery or via AC power. The external power source may be provided, for example, from a line provided from the AT&T Merlin system. If the headset amplifier 11 is operating with a carbon microphone and thus is placed in the carbon mode of operation, the headset amplifier 11 may receive power from the line via the handset jack or alternatively the power may be supplied from the voltage source 35 or an external power source coupled to the input terminal 36. Thus, in this case the switch common arm 22a may be coupled to either of the switch arms 22b, 22c.

When the headset amplifier operates on externally provided AC power, the DC power source 35 is disconnected via a switch 39. The voltage source 35 is preferably automatically disconnected when the amplifier operates on AC power. The externally provided AC power fed to input port 36 is coupled through a voltage regulator 37 to the branch arm 22c of the switch 22.

If the headset amplifier 11 is placed in the electret mode of operation then typically the power is supplied from either the voltage source 35 which may be provided as a battery for example or an external AC power supply source. Thus, in this case the switch common arm 22a is coupled to switch branch arm 22c.

Switch 26 includes common arm 26a and switch branch arms 26b, 26c. The switch common arm 26a is coupled to a transmit path amplification circuit 40. When the switch common arm 26a is coupled to the branch arm 26b, the headset amplifier 11 operates in the ETH mode and the transmit path amplification circuit 40 receives power from either the voltage source 35 or the external AC source coupled to the input port 36. When the switch common arm 26a is coupled to switch arm 26c, the headset amplifier 11 operates in the carbon mode and the transmit path amplification circuit 40 receives power from the line.

A portion of the received signal is coupled from the receive path amplification circuit 19 and fed to an input port 50 *a* of a time-out-timer circuit 50. When no signal is received by the headset amplifier 10 for a predetermined time, two minutes for example, the time-out-timer circuit 50 provides a signal at an output port 50 *b* to carbon/ETH select circuit 34.

In response to the signal fed from the time-out-timer circuit 50 to the carbon/ETH selector 34, the voltage source 35 is effectively de-coupled from the headset amplifier 10. Thus, the headset amplifier 11 is placed in a power down mode thereby conserving energy from the voltage source.

When a handset is picked up or an incoming call is received, a low level transient signal is provided. If the time-out-timer circuit 50 detects such a low level transient signal, the time-out-timer circuit 50 reactivates the previously deactivated headset amplifier circuitry by simply switching the power back on. This may be accomplished, for example, by switching the switches to appropriate switch positions and thereby re-coupling the headset amplifier 10 to the power source 35.

Figure 3:
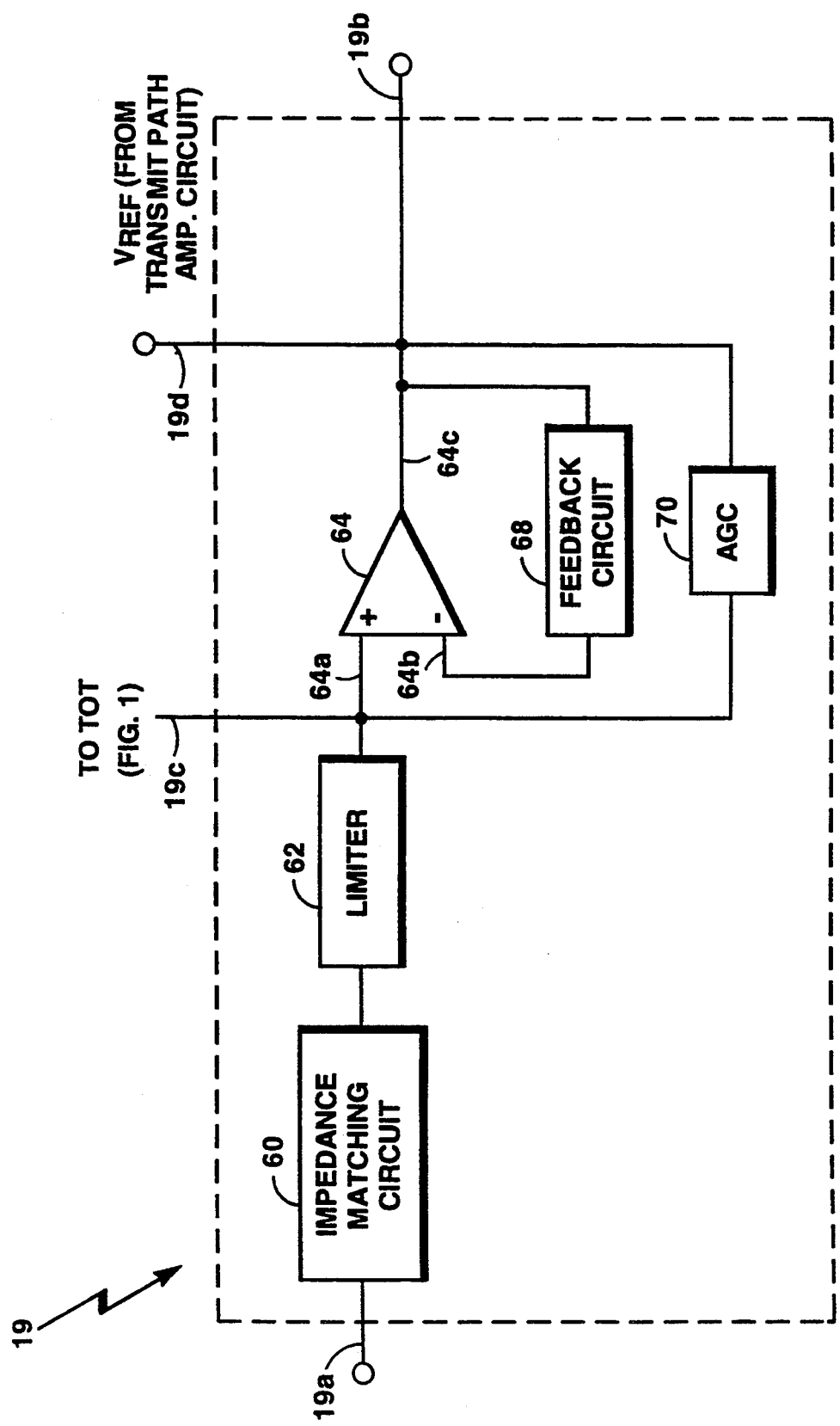
FIG. 3 is a block diagram of a receive path amplification circuit.

Referring now to FIG. 3 the receive path amplification circuit 19 includes an impedance matching circuit 60 having an input port coupled to the input port of the receive path amplification circuit 19 and having an output port coupled to an input port of a limiter circuit 62. The impedance matching and isolation circuit 60 provides the receive path amplification circuit 19 having an impedance such that signals are efficiently coupled from the input port of the amplifier circuit 19 to the input port of the limiter circuit 62.

The limiter circuit 62 is disposed to couple signals from the impedance matching circuit to a first port 64a of a differential amplifier circuit 64. A portion of the signal at the output of the limiter circuit 62 is coupled to the time-out-timer circuit 50 (FIGS. 1 and 3), such that time-out-timer circuit 50 may detect the presence of signals and reactivate the headset amplifier 11 in power down mode.

The differential amplifier circuit 64 has coupled thereto a negative feedback circuit 68. A portion of the signal at the output port 64c of the differential amplifier 64 is rectified and coupled through an automatic gain control (AGC) circuit 70 to the positive input attenuator 66a of the differential amplifier 64.

Figure 4:
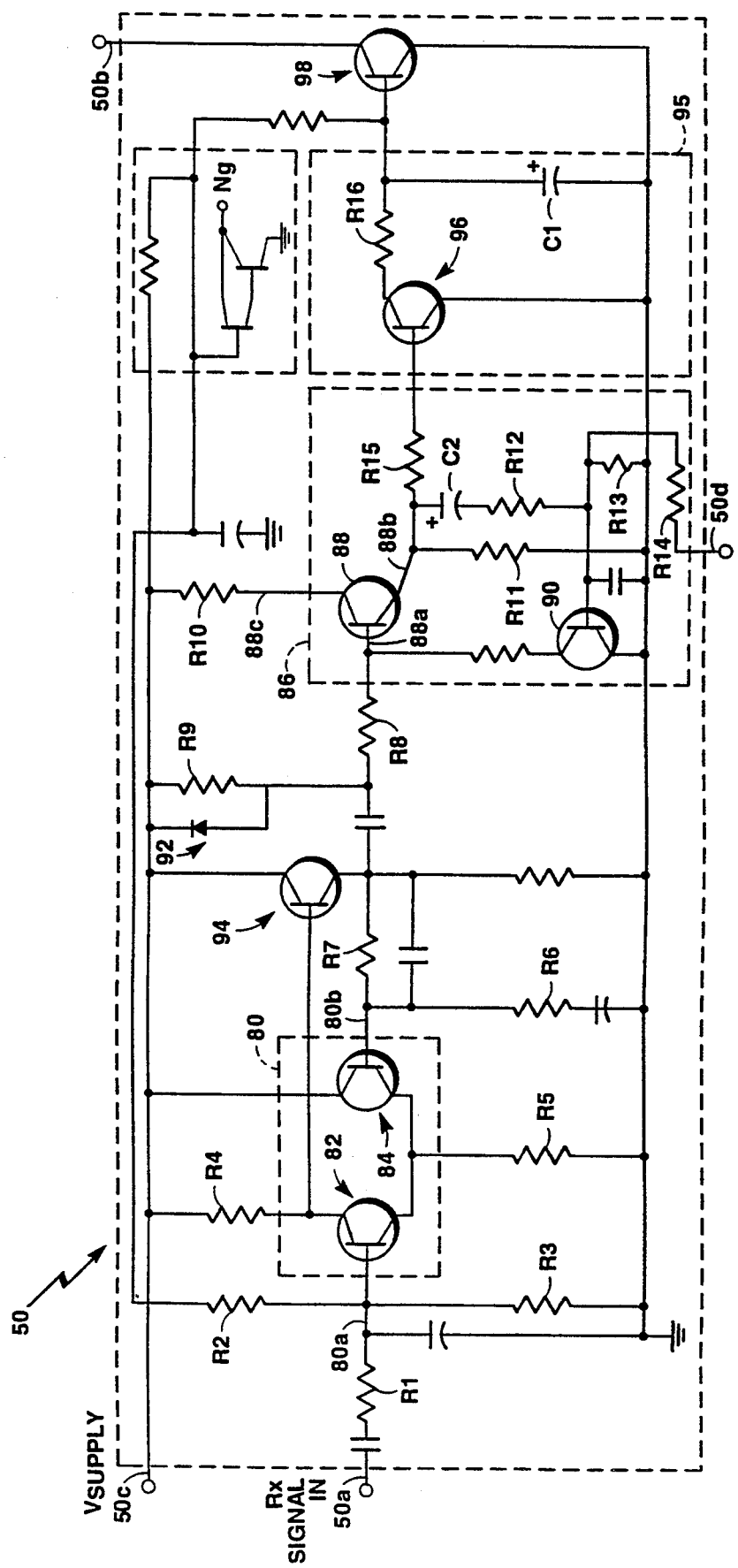
FIG. 4 is a schematic diagram of a time-out-timer circuit which may be used in a headset amplifier of the types shown in FIGS. 1, 2 and 5.

Referring now to FIG. 4, the time-out-timer circuit 50 includes an amplifier circuit 80 provided from transistors 82, 84 coupled as shown. An input port 80a of the amplifier circuit 80 is coupled to an input port 50a of the time-out-timer circuit 50 through a resistor R1. An output port 80b of the amplifier circuit 80 is coupled to a detector circuit 86 through serially connected resistor R8. The resistor R7 is negative feedback resistor and provides the output of the amplifier circuit having a high frequency roll-off characteristic.

A transistor 94 has a base electrode coupled to the collector of the transistor 82. An emitter electrode of the transistor 94 is coupled to the first reference potential $V_{SUPPLY}$ and a collector electrode of the transistor 94 is coupled to the base of a transistor 88 through the resistor R8. Thus, the transistor 94 swings rail to rail to provide a signal having a peak to peak voltage swing corresponding to $V_{SUPPLY}$ to drive the transistor 88.

The detector circuit 86 includes the transistor 88 having base, collector and emitter electrodes 88a–88c. The emitter electrode 88c is coupled to a first reference potential $V_{SUPPLY}$ through a resistor R10. The collector electrode 88b is coupled to a second reference potential through a resistor R11. The second reference potential here corresponds to ground. The base electrode 88a of the transistor 88 is coupled to a collector electrode of a second transistor 90.

The detector circuit 86 further includes a diode 92 coupled between the first reference voltage $V_{SUPPLY}$ and the base electrode of the transistor 88 through the resistor R8 as shown. The diode 92 provides DC restoration to the detector circuit 86. Thus, the detector is provided having maximum sensitivity. That is, the detector cannot become back biased and operates down to a supply voltage corresponding to 1.8 volts (V).

The emitter of transistor 90 is coupled to ground. A base electrode of the transistor 90 is coupled to an output port 50d of the time-out-timer circuit 50 through a resistor R14 as shown.

The output of the detector circuit 86 is coupled to the input of a charge/discharge circuit 95. The charge/discharge circuit 95 includes a transistor 96, a resistor R16 and a capacitor C1. The transistor 96 has a base electrode coupled to the output port of the detector circuit 86, an emitter electrode coupled to ground and a collector electrode coupled to a first electrode of the resistor R16. A second electrode of the resistor R16 is coupled to a base electrode of an output transistor 98. The capacitor C1 is coupled between the second electrode of the resistor R16 and ground. In response to a dial tone, switching transient or voice signal, the transistor 96 is biased into its conductive state to thus provide a low impedance path through which the capacitor C1 may discharge.

The detector circuit 86 is here provided from transistors 88 and 90 disposed in a regenerative loop. One-shot feedback coupled through the transistor 90 turns on the transistor 88 "hard" to drive the transistor 96 into its conductive state and discharge the capacitor C1. Thus, the capacitor C1 may be discharged even in response to a transient signal having a relatively small signal level and short duration. Furthermore by having a low voltage provided to the capacitor C1, allows the capacitor C1 to be provided as an aluminum capacitor having a relatively high capacitance while preventing leakage problems from occurring.

The timing of the one-shot is determined by the capacitance value of a capacitor C2 coupled between the output electrode of the transistor 88 and the base electrode of the transistor 90.

The signal provided to discharge the capacitor C1 should be provided having a pulse width of sufficient length to fully discharge the capacitor C1. Since a transient signal typically fails to have a pulse width of sufficient length to cause the capacitor C1 to fully discharge, the length of the pulse should be stretched. Thus, the regenerative loop "stretches" the pulse such that capacitor C1 fully discharges. Therefore signals having a relatively small amplitude level, typically of about −50 dBv, may activate and turn on the headset amplifier 10 when an incoming call is received.

A jump start signal fed to the input port 50d reactivates the headset amplifier 10 after the time-out-timer circuit 50 shuts off the headset amplifier circuit 10. This feature may be particularly useful when, for example, the time out timer circuit 50 powers down the amplifier because the headset is unattended for a predetermined amount of time. This may occur when a user must step away from the headset to retrieve a file, for example.

Figure 5:
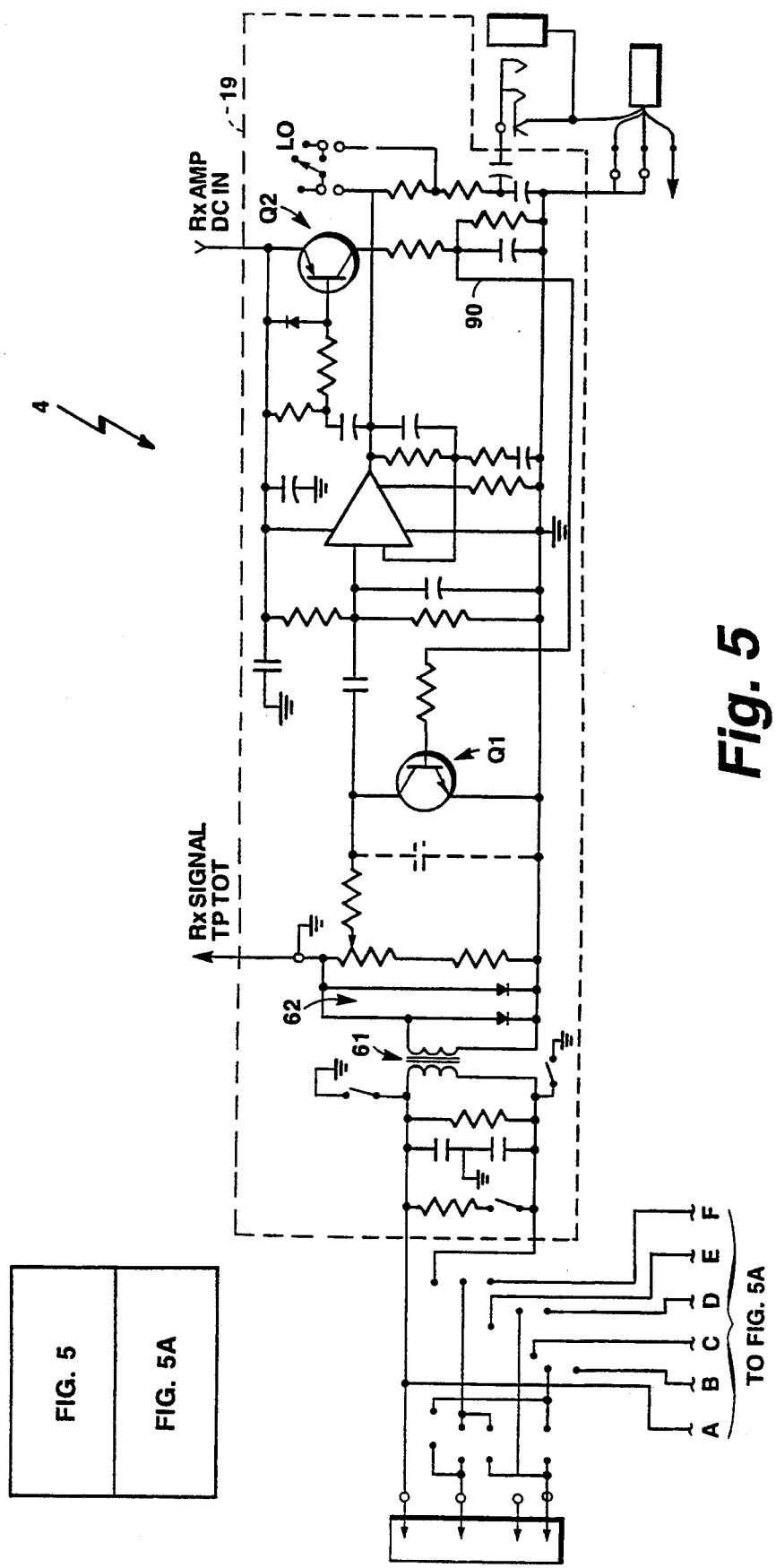
FIGS. 5 and 5A are a series of schematic diagrams of a universal headset amplifier.
Figure 5A:
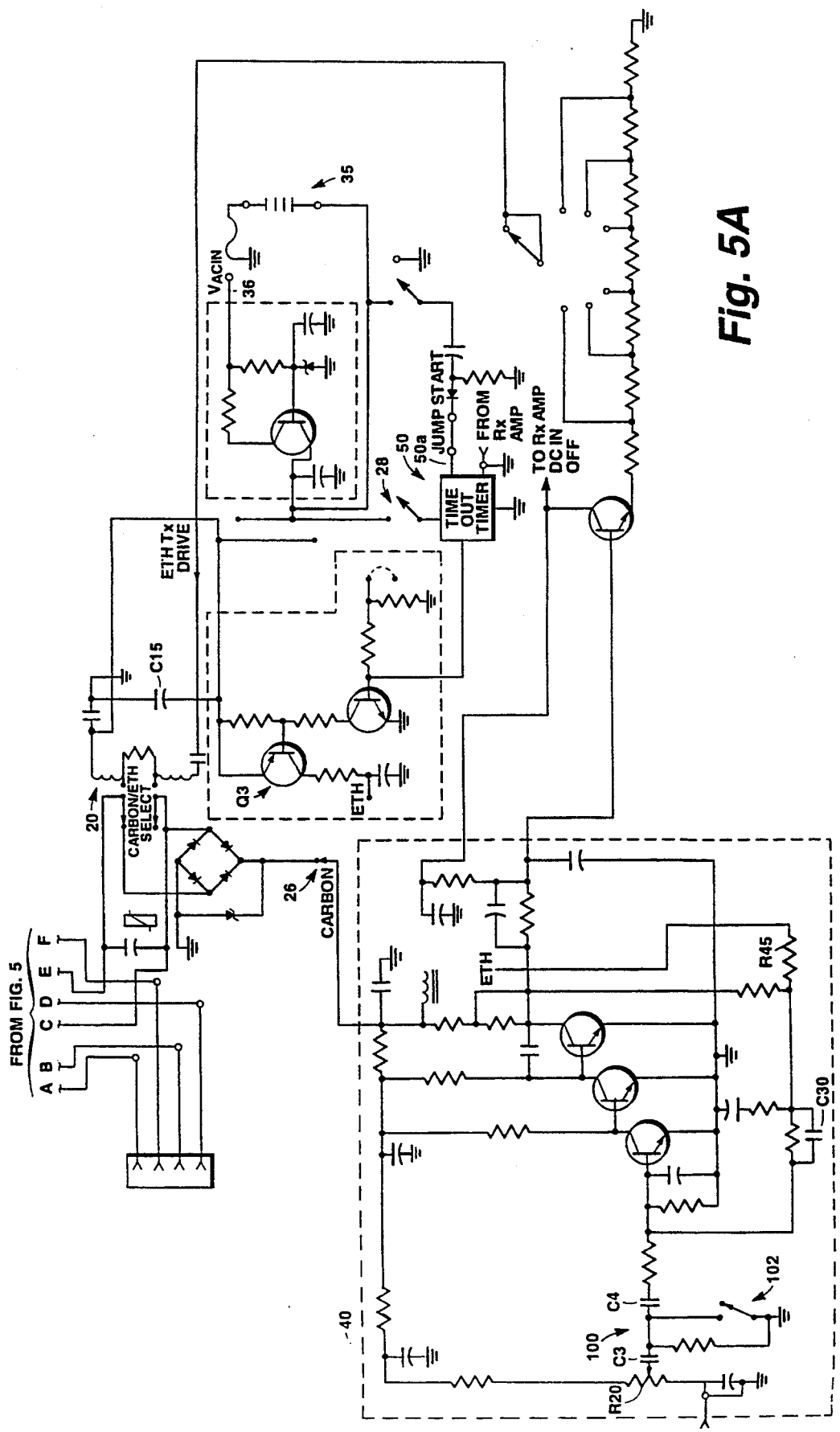

Referring now to FIGS. 5 and 5A in which like elements of the headset amplifier 10 of FIGS. 1–3 are provided having like reference designations, the impedance matching circuit 60 is provided from a transformer 61. The transformer 61 is coupled to the limiter circuit 62 here provided an anti-parallel coupled diode pair.

The AGC circuit 70 described above in conjunction with FIG. 2 is here shown to include transistors Q1, Q2 coupled through signal path 90. The transistor Q2 receives a filtered signal from the transmit path amplification circuit 40 at its emitter electrode. A portion of the signal from the output of the amplifier 64 is coupled through the base electrode of Q2 and fed to the signal path 90. The feedback signal is fed along signal path 90 to the base electrode of transistor Q1. The collector electrode of the transistor Q1 is coupled to the input port of the amplifier 64 as shown.

The transmit signal path amplification circuit 40 includes a mute circuit 100. Silent mute in transmit mode may be provided when any signal is switched to ground through switch 102. Capacitors C3, C4 are provide DC isolation.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A headset amplifier comprising:
    a transmit path amplification circuit;
    a receive path amplification circuit;
    a voltage source coupled to each of said receive and transmit path amplification circuits;
    a time-out-timer circuit, coupled to said receive path amplification circuit, said time-out-timer detecting whether said receive path amplification circuit receives a signal and if after a first predetermined period of time said receive path amplification circuit fails to receive a signal, said time-out-timer circuit deactivating said headset amplifier circuit; and
    a jump start circuit coupled to said time-out-timer circuit, said jump start circuit providing a jump start signal to said time-out-timer circuit in response to a lower level transient signal to reactivate said headset amplifier circuit after said time-out-timer circuit has deactivated said headset amplifier circuit.

2. The headset amplifier of claim 1 wherein said time-out-timer circuit reactivates the headset amplifier in response to a signal having a predetermined amplitude.

3. The headset amplifier of claim 2 wherein said time-out-timer circuit further comprises:
    a time-out-timer amplifier circuit having an input port and an output port;
    a detector circuit having an input port coupled to the output port of said time-out-timer amplifier circuit, an output port, and a jump start port comprising the jump start port of said time-out-timer circuit; and a charging and discharging circuit having an input port coupled to the output port of said detector circuit and having an output port coupled to the output port of said time-out-timer circuit.

4. The headset amplifier of claim 3 wherein said receive path amplification circuit further comprises:
an impedance matching circuit for matching the amplifier input port impedance to the impedance of a first one of a carbon or electret microphone;
a limiter circuit having an input port coupled to a first port of the impedance matching circuit and having an output port;
an amplifier circuit having a first input port coupled to the output port of the limiter circuit and having an output port; and
an automatic gain control loop having a first input port coupled to the output port of said amplifier circuit and having an output port coupled to an input port of said amplifier circuit.

5. An amplifier having a first port adapted to couple to a telephone base assembly, a second port adapted to couple to a handset assembly, a third port adapted to couple to a headset assembly said amplifier comprising:
a receive circuit for receiving signals from a first one of a the headset assembly or the handset assembly;
a select circuit for placing the amplifier in a first one of a carbon or an electret mode of operation;
a power select circuit for coupling the amplifier to a first one of a battery power source, an AC power source or a host telephone power source;
a time-out-timer, coupled between the receive path amplifier circuit and the select circuit, for deactivating the amplifier after a first predetermined period of time and for reactivating the amplifier in response to a signal having a predetermined amplitude, said time-out-timer comprising:
a time-out-timer amplifier circuit, having an input port coupled to an input port of the time-out-timer, and an output port;
a regenerative detector circuit having an input port coupled to the output port of the time-out-timer amplifier circuit;
a charging and discharging circuit having an input port coupled to the output port of the regenerative detector circuit and having an output port coupled to an output port of the time-out-timer circuit; and
a jump start circuit coupled to said time-out-timer, said jump start circuit providing a signal to said time-out-timer in response to a low level transient signal to reactivate the amplifier after said time-out-timer has deactivated the amplifier after a first predetermined period of time,
wherein said regenerative detector circuit provides a signal having a pulse width sufficient to ensure that said charging and discharging circuit discharges to a predetermined level.

6. The amplifier circuit of claim 5 wherein said regenerative detector circuit comprises:
a first transistor having a first electrode coupled to a first reference potential, a second electrode coupled to the input port of said regenerative detector circuit and a third electrode coupled to a second reference potential;
a second transistor having first, second and third electrodes wherein the first electrode of said second transistor is coupled to the second electrode of the first transistor, the third electrode of the second transistor is coupled to the second reference potential and said second electrode of the second transistor is coupled to said jump start circuit; and
a diode having an anode coupled to a third input port of said regenerative detector circuit and having a cathode coupled to the second electrode of the second transistor, wherein in response to a signal being applied to the third input port of said regenerative detector circuit said time-out-timer circuit reactivates said amplifier circuit.

7. A time-out-timer circuit having first, second and third input ports and having an output port wherein the time-out-timer circuit is adapted for operating with a headset amplifier, the time-out-timer circuit comprising:
a time-out-timer amplifier circuit, having an input port coupled to an input port of the time-out-timer, and an output port;
a detector circuit having an input port coupled to the output port of the time-out-timer amplifier circuit, said detector circuit for detecting signals fed to the headset amplifier; and
a charging and discharging circuit having an input port coupled to the output port of the detector circuit and having an output port coupled to an output port of the time-out-timer circuit, wherein the time-out-timer circuit provides a signal to deactivate the headset amplifier after said detector circuit has not detected any signals for a first predetermined period of time and wherein said time-out-timer circuit provides a second signal to reactivate the headset amplifier in response to a first one of the following conditions:
a signal is fed to the third input port from a jump start circuit wherein the signal corresponds to a low level transient signal; and
said detector circuit detects a signal fed to the headset amplifier.

8. The time-out-timer circuit of claim 7 wherein said detector circuit comprises:
a first transistor having a first electrode coupled to a first reference potential, a second electrode coupled to the input port of said regenerative detector circuit and a third electrode coupled to a second reference potential;
a second transistor having first, second and third electrodes wherein the first electrode of said second transistor is coupled to the second electrode of the first transistor, the third electrode of the second transistor is coupled to the second reference potential and said second electrode of the second transistor is coupled to said jump start circuit; and
a diode having an anode coupled to a third input port of said regenerative detector circuit and having a cathode coupled to the second electrode of the second transistor, wherein in response to a signal being applied to the third input port of said regenerative detector circuit said time-out-timer circuit reactivates said amplifier circuit.

9. The time-out-timer circuit of claim 8 wherein said charging and discharging circuit comprises:
a first transistor having first, second and third electrodes wherein a first electrode of said transistor is coupled to an input port of the charging and discharging circuit, a second electrode of said transistor is coupled to an output port of said charging and discharging circuit and the third electrode of said transistor is coupled to the second reference potential; and
a capacitor having a first terminal coupled to the second electrode of said transistor and a second terminal of said capacitor is coupled to the second reference potential, wherein in response to a signal said first transistor is biased into its conductive state to discharge said capacitor.

* * * * *

UNITED STATES PATENT AND TRADEMARK OFFICE
CERTIFICATE OF CORRECTION

PATENT NO. : 5,396,551
DATED : March 7, 1995
INVENTOR(S) : Robert E. Lucey

It is certified that error appears in the above-indentified patent and that said Letters Patent is hereby corrected as shown below:

Column 7, line 61, "potential;" should read --potential; and--

Column 7, line 69, "jump start circuit; and" should read --jump start circuit at a second input port of said time-out-timer circuit; and--.

Column 8, line 1, "an anode coupled to a third input port" should read --a cathode coupled to the second input port--.

Column 8, lines 2/3/4, "a cathode coupled to the second electrode of the second transistor" should read --an anode coupled to said jump start circuit--.

Column 8, line 5, "third input port" should read --second input port--.

Signed and Sealed this

Twenty-fifth Day of June, 1996

Attest:

BRUCE LEHMAN

Attesting Officer   Commissioner of Patents and Trademarks